United States Patent [19]

Kunimune et al.

[11] Patent Number: 4,963,635

[45] Date of Patent: Oct. 16, 1990

[54] PROCESSES FOR THE PRODUCTION OF SILICON-CONTAINING POLYIMIDES PRECURSORS, AND THEIR CURED POLYIMIDES LOW IN HYGROSCOPICITY

[75] Inventors: Kouichi Kunimune, Ichihara; Yoshiya Kutsuzawa, Yokohama, both of Japan

[73] Assignee: Chisso Corporation, Osaka, Japan

[21] Appl. No.: 315,142

[22] Filed: Feb. 24, 1989

[30] Foreign Application Priority Data

Feb. 26, 1988 [JP] Japan ................................ 63-43387

[51] Int. Cl.$^5$ ............................................. C08G 77/04
[52] U.S. Cl. ........................................ 528/26; 528/38; 528/28; 528/27
[58] Field of Search ................ 528/38, 28, 27, 26

[56] References Cited

U.S. PATENT DOCUMENTS 4,748,228 5/1988 Shoji et al. ............................. 528/28
4,818,806 4/1989 Kunimune et al. ..................... 528/38

FOREIGN PATENT DOCUMENTS 0208396 1/1987 European Pat. Off. .
0241937 10/1987 European Pat. Off. .
2174399 11/1986 United Kingdom .

Primary Examiner—Melvin I. Marquis
Assistant Examiner—Karen A. Hellender
Attorney, Agent, or Firm—Fred Philpitt

[57] ABSTRACT

The present invention provides a process for the production of silicon-containing polyimide presursors that have a viscosity most suitable for application, and when baked, can form a coating low in hygroscopicity, heat resistant, and having powerful adhesion, and a process for their cured silicon-containing polyimide.

A process for the production of silicon-containing polyimide precursors having a logarithmic viscosity number of 0.05 to 5 dl/g by reacting $A^1$ mol of fluorine-containing diacid anhydride, $A^2$ mol of a diacid anhydride, $B^1$ mol of a fluorine-containing diamine, $B^2$ mol of a diamine, and C mol of an aminosilane with the mixing ratio of them such that $A^1$, $A^2$, $B^1$, $B^2$, and C are within ranges having prescribed relationships, and a process for the production of a silicon-containing polyimide by baking a solution of said precursor at 50° to 500° C.

5 Claims, No Drawings

PROCESSES FOR THE PRODUCTION OF SILICON-CONTAINING POLYIMIDES PRECURSORS, AND THEIR CURED POLYIMIDES LOW IN HYGROSCOPICITY

BACKGROUND OF THE INVENTION

1. Field of the Invention

The present invention relates to processes for the production of silicon-containing polyimides low in hygroscopicity, and their precursors. More particularly, the present invention relates to processes for the production of silicon-containing polyimide precursors having a viscosity most suitable to be applied and their cured silicon-containing polyimides low in hygroscopicity and high in heat resistance and capable of forming a coating having powerful adhesion.

2. Prior Art

Polyimide resins are conventionally used widely as protective materials or insulating materials in the field of electronic equipment, or adhesives in the form of films, or structural materials mainly from the point of view of their heat resistance. In some techniques, polyimide resins are often combined with other inorganic materials to form heat resistant films, coatings, or adhesives. In that case, adhesion to the base material is required, and as techniques of improving the adhesion, use of various copolymers with silicon compounds is suggested. For example, such copolymers are disclosed in Japanese Laid-Open Patent Application Nos. 143328/1982, 7473/1983, and 13631/1983, and Japanese Patent Publication Nos. 18372/1983, 32162/1983, and 32163/1983, and the present inventors also suggested such copolymers in Japanese Laid-Open Patent Application No. 287926/1986, and Japanese Patent Application No. 162018/1987.

On the other hand, one of the weak points of polyimide resins is that the hygroscopicity thereof is high, deteriorating the electric properties. In order to lower the hygroscopicity, various fluorine-containing polyimides are suggested as described in Japanese Laid-Open Patent Application Nos. 149916/1983, 180530/1983, 189122/1984, 104129/1985, etc.

The hygroscopicity of fluorine-containing polyimides described in Japanese Laid-Open Patent Application Nos. 149916/1983, 180530/1983, 189122/1984, and 104129/1985 mentioned above is decreased 1/several times to about 1/10 times as much as that of usual polyimides free from fluorine, so that the effect is obvious.

However, such compounds have such disadvantages that not only they are inferior in adhesion to glass or the like but they are also low in glass transition point so that the thermal expansion coefficient thereof at a temperature over the glass transition point is extremely high thereby limiting the range of their application.

On the other hand, some compounds described in Japanese Laid-Open Patent Application Nos. 143328/1982, 7473/1983, and 13631/1983, and Japanese Patent Publication Nos. 18372/1983, 32162/1983, and 32163/1983, and Japanese Laid-Open Patent Application No. 287926/1986 mentioned above are lowered in hygroscopicity, but the effect of lowering hygroscopicity is not so remarkable as that of fluorine-containing compounds, and they also have such disadvantages that the glass transition point is low, and the thermal expansion coefficient at a temperature over the glass transition point is conspicuously high. Thus, the prior art techniques are accompanied by various problems, and therefore development of polyimide materials low in hygroscopicity and high in adhesion have been desired.

SUMMARY OF THE INVENTION

The object of the present invention is to provide a process for the production of silicon-containing polyimide precursors that have a viscosity appropriate for the formation of a film, for example, by coating, and can form, by baking a film formed by coating, a coating that has a thermal expansion coefficient similar to that of common polyimides, is low in hygroscopicity, and possesses powerful adhesion, and to provide a process for the production of silicon-containing polyimides that will be obtained by baking said silicon-containing polyimide precursors.

The present invention relates to a process for the production of a silicon-containing polyimide precursor that has a logarithmic viscosity number of 0.05 to 5 dl/g measured at an in-solvent temperature of 30°±0.01° C. with the concentration being 0.5 g/dl, characterized by reacting $A^1$ mol of a fluorine-containing diacid anhydride represented by the formula (I) given below, $A^2$ mol of a diacid anhydride represented by the formula (II) given below, $B^1$ mol of a fluorine-containing diamine represented by the formula (III) given below, $B^2$ mol of a diamine represented by the formula (IV) given below, and C mol of an aminosilane represented by the formula (V) given below with the mixing ratio being in the ranges given by the formulae (VI) to (VIII) given below, and to a process for the production of a silicon-containing polyimide by baking said precursor:

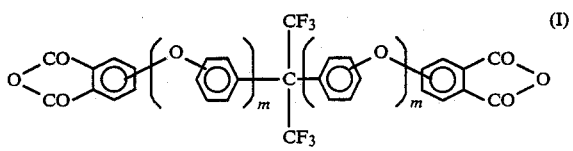

(I)

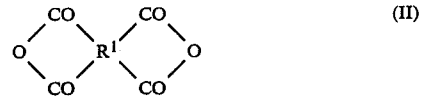

(II)

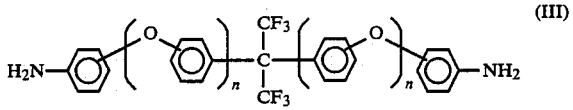

(III)

$$H_2N-R^2-NH_2 \quad (IV)$$

$$NH_2-R^3-SiR^4_{3-k}X_k \quad (V)$$

(VI)

(VII)

$$\frac{C}{B^1 + B^2 + C} \geq 0.05 \quad (VIII)$$

wherein $R^1$'s each independently represent a tetravalent carbocyclic aromatic group or heterocyclic group, $R^2$'s each independently represent an aliphatic group that has at least two carbon atoms, an alicyclic group, an araliphatic group, a carbocyclic aromatic group, a heterocyclic group, or a polysiloxane group, $R^3$ represents

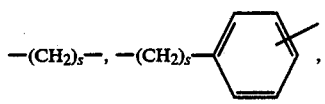

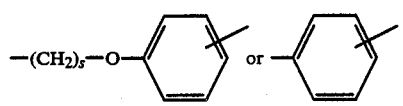

wherein s is an integer of 1 to 4, $R^4$'s each independently represent an alkyl group having 1 to 6 carbon atoms, a phenyl group, an alkyl-substituted phenyl group having 7 to 12 carbon atoms, X's each independently represent an alkoxy group, an acetoxy group, or halogen, m's each independently is a value of 0 or 1, n's each independently is a value of 0 or 1, and k is such a value that $1 \leq k \leq 3$. The ranges of $B^1$, $B^2$ and C are preferably ranges given by the following formula (IX):

$$\frac{C}{B^1 + B_2 + C} \geq 0.2 \tag{IX}$$

Preferably, $R^3$ represents a group represented by

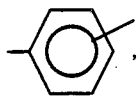

which is in the form of at least one of o—, m—, and p— isomers.

A silicon-containing polyimide can be produced by baking a solution containing said silicon-containing polyimide precursor at 50° to 500° C. so that the solvent may be evaporated, and the compound may be crosslinked to cure.

The present invention provides a process for the production of a silicon-containing polyimide precursor that has a logarithmic viscosity number of 0.05 to 5 dl/g measured at an in-solvent temperature of 30°±0.01° C. with the concentration being 0.5 g/dl, characterized by reacting, as raw materials, compounds represented by formulae (I) to (V) with the mixing ratio of them being kept within in the ranges given by formulae (VI) to (VIII), and also provides a process for the production of a silicon-containing polyimide by baking a solution containing the precursor obtained by the above process at 50° to 500° C. so that the solvent may be evaporated and the compound may be crosslinked to cure.

DETAILED DESCRIPTION OF THE INVENTION

As the fluorine-containing diacid anhydride represented by formula (I) that is a raw material, following compounds can be exemplified: 2,2-bis(3,4-dicarboxyphenyl)-hexafluoropropane dianhydride, 2-(3,4-dicarboxyphenyl)-2-{4-(3,4-dicarboxyphenyl)phenoxy}-hexafluoropropane dianhydride, 2,2-bis{4-(3,4-dicarboxyphenyl)phenoxy}-hexafluoropropane, 2,2-bis{3-(3,4-dicarboxyphenyl)phenoxy}-hexafluoropropane, and 2,2-bis{4-(2,3-dicarboxyphenyl)phenoxy}-hexafluoropropane.

The diacid anhydride represented by formula (II) will be described below.

When $R^1$ is a carbocyclic aromatic group, the group has preferably at least one 6-membered ring. $R^1$ is particularly a monocyclic aromatic group, a condensed polycyclic aromatic group, or a polycyclic aromatic group having several condensed rings or non-condensed rings (which bond together directly or via a bridging group).

As the above bridging group, for example, the following groups are suitable:

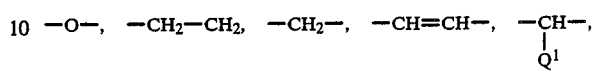

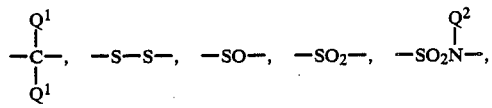

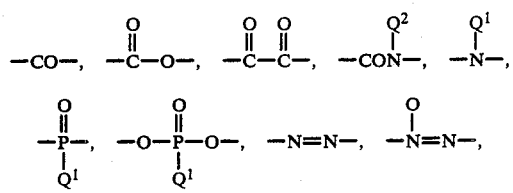

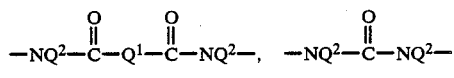

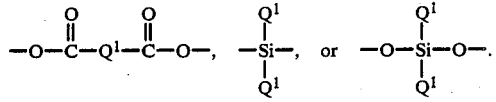

In the above formulae;

$Q^1$ represents an alkyl group or an alkylene group having 1 to 6, preferably 1 to 4, carbon atoms, a cycloalkyl group, an aryl group or an arylene group, $Q^2$ represents a hydrogen atom, a cycloalkyl group, or an aryl group, or an alkyl group having 1 to 4 carbon atoms which may be substituted by one or more halogen atoms, or $Q^1$ and $Q^2$ each may represent a group formed by bonding the above groups together via two bridging groups for example via two —$SO_2$— groups.

When $R^1$ represents a heterocyclic group, particular examples thereof are a 5- or 6-membered heterocyclic aromatic group containing oxygen, nitrogen and/or sulfur, or a condensed cyclic group formed by condensation of such a heterocyclic aromatic group with a benzene nucleus.

The carbocyclic aromatic group or the heterocyclic group represented by $R^1$ may be one substituted, for example, by one or more nitro groups, alkyl groups having 1 to 4 carbon atoms, silyl groups or sulfamoyl groups.

The group represented by $R^1$ may be one that may not be substituted or may be substituted, for example, by one or more alkyl groups or alkoxy groups having 1 to 4 carbon atoms.

With respect to $R^1$'s, it is preferable that $R^1$'s each independently represent an unsubstituted monocyclic aromatic group, an unsubstituted condensed polycyclic aromatic group or an unsubstituted uncondensed dicyclic aromatic group. The unsubstituted uncondensed dicyclic aromatic group mentioned above is a group wherein two aromatic groups are bonded together via a bridging group —O— or —CO—.

Examples of the tetracarboxylic acid dianhydride represented by formula (II) include:

pyromellitic acid dianhydride, 3,3',4,4'-benzophenonetetracarboxylic acid dianhydride, 2,3,3',4'-benzophenonetetracarboxylic acid dianhydride, 2,2',3,3'-benzophenonetetracarboxylic acid dianhydride, 3,3',4,4'-diphenyltetracarboxylic acid dianhydride, 2,2',3,3'-diphenyltetracarboxylic acid dianhydride, bis(2,3-dicarboxyphenyl)-methane dianhydride, bis(3,4-dicarboxyphenyl)methane dianhydride, 2,2-bis(2,3-dicarboxyphenyl)propane dianhydride, bis(3,4-dicarboxyphenyl)ether dianhydride, bis(3,4-dicarboxyphenyl)sulfone dianhydride, N,N-(3,4-dicarboxylphenyl)-N-methylamine dianhydride, 3,3',4,4'-tetracarboxybenzoyloxybenzene dianhydride, 2,3,6,7'-naphthalenetetracarboxylic acid dianhydride, 1,2,5,6'-naphthalenetetracarboxylic acid dianhydride, thiophene-2,3,4,5-tetracarboxylic acid dianhydride, pyrazine-2,3,5,6-tetracarboxylic acid dianhydride, pyridine-2,3,5,6-tetracarboxylic acid dianhydride, and 2,3,3',4'-biphenyltetracarboxylic acid dianhydride.

As the fluorine-containing diamine represented by formula (III), the following compounds may be exemplified:

2,2-bis(4-aminophenyl)hexafluoropropane, 2,2-bis(3-aminophenyl)hexafluoropropane, 2,2-bis{4-(4-aminophenoxy)phenyl}hexafluoropropane, 2-(3-aminophenyl)-2-{4-(4-aminophenoxy)phenyl}hexafluoropropane, 2,2-bis{4-(3-aminophenoxy)phenyl}hexafluoropropane, 2,2-bis{3-(4-aminophenoxy)phenyl}hexafluoropropane, and 2,2-bis{3-(3-aminophenoxy)phenyl}hexafluoropropane.

The diamine represented by formula (IV) will now be described below.

When $R^2$ represents the carbocyclic aromatic group, preferable examples thereof include a monocyclic aromatic group, a condensed polycyclic aromatic group, or a uncondensed dicyclic aromatic group. In the uncondensed dicyclic aromatic group, aromatic groups are bonded together via a bridging group, which bridging group is the same one as that described for $R^1$.

When $R^2$ represents a heterocyclic group, it is particularly a 5- or 6-membered heterocyclic aromatic group containing O, N and/or S.

When $R^2$ represents an aliphatic group, an example thereof is particularly an alkylene group having 2 to 12 carbon atoms that may include a hetero atom such as an oxygen atom, a sulfur atom or a nitrogen atom in the alkylene chain.

When $R^2$ represents an alicyclic group, an example thereof is a cyclohexyl group or a dicyclohexylmethane group, while when $R^2$ represents an araliphatic group, examples thereof are a 1,3-, 1,4- or 2,4-bis-alkylenebenzene group, a 4,4'-bis-alkylene-diphenyl group, and a 4,4'-bis-alkylene-diphenyl ether group.

With respect to $R^2$'s, it is preferable that $R^2$'s each independently represent a monocyclic aromatic group or uncondensed dicyclic aromatic group having, as substituents one or more alkyl groups or alkoxy groups with 1 to 4 carbon atoms, or an unsubstituted monocyclic araliphatic group or an unsubstituted aliphatic group having 2 to 10 carbon atoms.

When $R^2$ represents a polysiloxane group, it is represented by the following formula (XI):

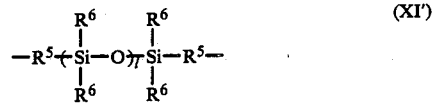

wherein $R^5$'s each independently represent $—(CH_2)_s—$,

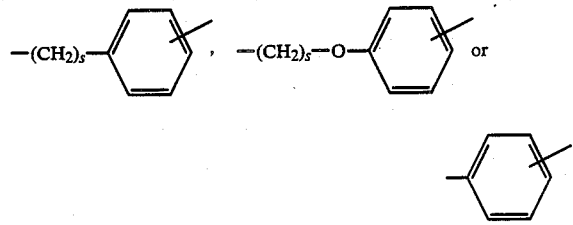

wherein s is an integer of 1 to 4, $R^6$'s each independently represent an alkyl group having 1 to 6 carbon atoms, a phenyl group, or an alkyl-substituted phenyl group having 7 to 12 carbon atoms, and l is such a value that $1 \leq l \leq 100$.

As the diamine represented by formula (IV), known compounds may be used.

As examples of the carbocyclic aromatic diamine, particularly the following compounds can be mentioned:

o-, m- and p-phenylenediamine, diaminotoluenes (e.g., 2,4-diaminotoluene), 1,4-diamino-2-methoxybenzene, 2,5-diaminoxylenes, 1,3-diamino-4-chlorobenzene, 1,4-diamino-2,5-dichlorobenzene, 1,4-diamino-2-boromobenzene, 1,3-diamino-4-isopropylbenzene, N,N'-diphenyl-1,4-phenylenediamine, 4,4'-diaminodiphenyl-2,2-propane, 4,4-'diaminodiphenylmethane, 2,2'-diaminostilbene, 4,4-'diaminodiphenyl ether, 4,4'-diaminodiphenyl thioether, 4,4'-diaminodiphenyl sulfone, 3,3'-diaminodiphenyl sulfone, 4,4'-diaminobenzoic acid phenyl ester, 2,2'-diaminobenzophenone, 4,4-'diaminobenzophenone, 4,4'-diaminobenzyl, 4-(4'-aminophenylcarbamoyl)-aniline, bis(4-aminophenyl)-phosphine oxide, bis(4-aminophenyl)-methyl-phosphine oxide, bis(3-aminophenyl)-methylsulfine oxide, bis(4-aminophenyl)-phenylphosphine oxide, bis(4-aminophenyl)-cyclohexylphosphine oxide, N,N-bis(4-aminophenyl)-N-phenylamine, N,N-bis(4-aminophenyl)-N-methylamine, 4,4'-diaminodiphenyl urea, 1,8-diaminonaphthalene, 1,5-diaminonaphthalene, 1,5-diaminoanthraquinone, diaminofluoranthene, bis(4-aminophenyl)-diethylsilane, bis(4-aminophenyl)-dimethylsilane, bis(4-aminophenyl)-tetramethyldisiloxane, 3,4'-diaminodiphenyl ether, benzidine, 2,2'-dimethylbenzidine, 2,2-bis[4-(4-aminophenoxy)phenyl]-propane, bis[4-(4-aminophenoxy)phenyl]sulfone, 4,4'-bis(4-aminophenyoxy)biphenyl, 1,4-bis(4-aminophenoxy)benzene, and 1,3-bis(4-aminophenoxy)benzene.

Examples of the heterocyclic diamine are the following compounds:

2,6-diaminopyridine, 2,4-diaminopyrimidine, 2,4-diamino-s-triazine, 2,7-diamino-dibenzofuran, 2,7-diaminocarbazole, 3,7-diaminophenothiazine, 2,5-diamino-1,3,4-thiadiazole, and 2,4-diamino-6-phenyl-s-triazine.

Examples of the aliphatic diamine are the following compounds:

dimethyldiamine, trimethylenediamine, tetramethylenediamine, hexamethylenediamine, heptamethylenediamine, heptamethylenediamine, octamethylenediamine, nonamethylenediamine, decamethylenediamine, 2,2-dimethylpropylenediamine, 2,5-dimethylhexamethylenediamine, 2,5-dimethylheptamethylenediamine, 4,4-dimethylheptamethylenediamine, 3-methylheptamethylenediamine, 3-methoxyheptamethylenediamine, 5-methylnonamethylenediamine, 2,11-diaminododecane, 1,12-diaminooctadecane, 1,2-bis(3-aminopropoxy)-ethane, N,N'-dimethylethylenediamine, N,N'-diethyl-1,3-diaminopropane, N,N'-dimethyl-1,6-diaminohexane, a diamine represented by the formula: $H_2N(CH_2)_3O(CH_2)_2O(CH_2)_3NH_2$, and a diamine represented by the formula: $H_2N(CH_2)_3NH_2$.

Suitable compounds as the alicyclic diamine are 1,4-diaminocyclohexane and 4,4'-diaminodicyclohexylmethane, and suitable compounds as the araliphatic diamine are 1,4-bis(2-methyl-4-aminopentyl)benzene, 1,4-bis(1,1-dimethyl-5-aminopentyl)benzene, 1,3-bis(aminomethyl)benzene, and 1,4-bis(aminomethyl)benzene.

As diaminopolysiloxanes that are formed by attaching amino groups to both ends of a group represented by formula (XI) can be mentioned the following compounds:

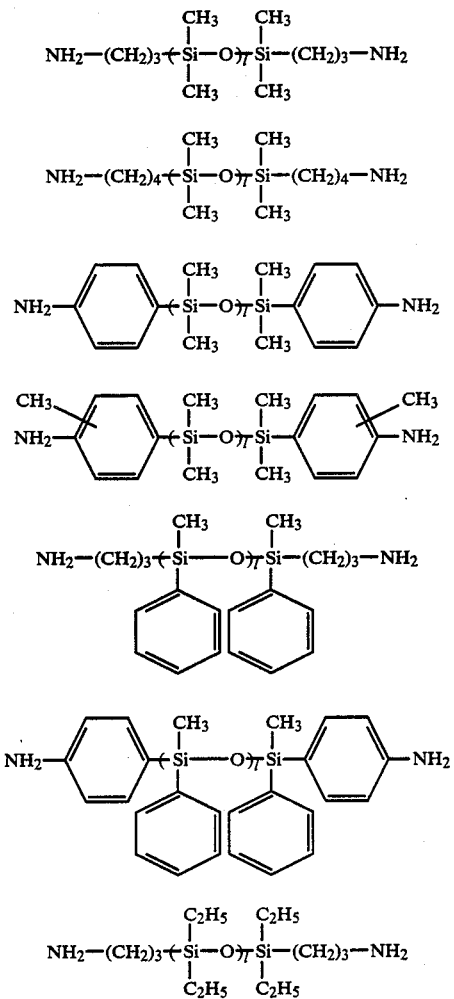

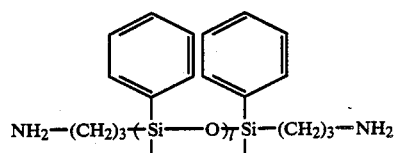

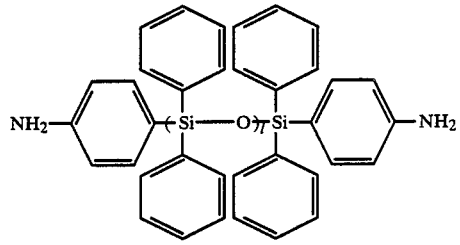

As the aminosilane represented by formula (V) can be mentioned the following compounds:

aminomethyl-di-n-propoxy-methylsilane, ($\beta$-aminoethyl)-di-n-propoxy-methylsilane, ($\beta$-aminoethyl)-diethoxyphenylsilane, ($\beta$-aminoethyl)-tri-n-propoxysilane, ($\beta$-aminoethyl)-dimethoxy-methylsilane, ($\gamma$-aminopropyl)-di-n-propoxy-methylsilane, ($\gamma$-aminopropyl)-di-n-butoxymethylsilane, ($\gamma$-aminopropyl)-trimethoxysilane, ($\gamma$-aminopropyl)-triethoxysilane ($\gamma$-aminopropyl)-di-n-pentoxyphenylsilane, ($\gamma$-aminopropyl)-methoxy-n-propoxymethylsilane, ($\delta$-aminobutyl)-dimethoxy-methylsilane, (3-aminophenyl)-di-n-propoxymethylsilane, (4-aminophenyl)-tri-n-propoxysilane, [$\beta$-(4-aminophenyl)-ethyl]-diethoxymethylsilane, [$\beta$-(3-aminophenyl)-ethyl-di-n-propoxyphenylsilane, [$\gamma$-(4-aminophenyl)-propyl]-di-n-propoxymethylsilane, [$\gamma$-(4-aminophenoxy)-propyl]-di-n-propoxymethylsilane, [$\gamma$-(3-aminophenoxy)-propyl]-di-n-butoxymethylsilane, ($\gamma$-aminopropyl)-methyl-dimethoxysilane, ($\gamma$-aminopropyl)-methyl-diethoxysilane, ($\gamma$-aminopropyl)-ethyl-di-n-propoxysilane, 4-aminophenyl-trimethoxysilane, 3-aminophenyltrimethoxysilane, 4-aminophenyl-methyl-di-methoxysilane, 3-aminophenyl-di-methyl-methoxysilane, and 4-aminophenyl-tri-ethoxysilane.

Preferable solvents that are used for reacting the above raw material compounds in the present invention (hereinafter sometimes referred to as "reaction solvent") are N-methyl-2-pyrrolidone, N,N-dimethylacetamide, N,N-dimethylformamide, dimethylsulfoxide, tetramethylurea, pyridine, dimethyl sulfone, hexamethylenephosphoramide, methylformamide, N-acetyl-2-pyrrolidone, ethylene glycol monomethyl ether, ethylene glycol monoethyl ether, ethylene glycol monobutyl ether, diethylene glycol monomethyl ether, diethylene glycol dimethyl ether, cyclopentanone, cyclohexanone, cresol, N,N-diethylacetamide, N,N-dimethylmethoxyacetamide, tetrahydrofuran, N-acetyl-2-pyrrolidone, and N-methyl-$\epsilon$-caprolactam, tetrahydrothiophene dioxide (sulpholane).

This reaction can be carried out in a solvent mixture obtained by mixing organic solvents as mentioned above. The above preferable organic solvents may be diluted with other non-protonic (neutral) organic solvent, for example, aromatic, alicyclic, or aliphatic hydrocarbons or their chlorinated derivatives (e.g., benzene, toluene, xylenes, cyclohexane, pentane, petroleum ether, and methylene chloride), or dioxane.

$A^1$ mol of a fluorine-containing diacid anhydride represented by formula (I), $A^2$ mol of a diacid anhydride represented by formula (II), $B^1$ mol of a fluorine-containing diamine represented by formula (III), $B^2$ mol of a diamine represented by formula (IV), and C mol of an aminosilane represented by formula (V) are reacted in a reaction solvent. In this case, it is preferable that $A^1$, $A^2$, $B^1$, $B^2$, and C are in such ranges that the relationships given by formulae (VI) to (VIII) are established. Formula (VI) indicates the required amount of the fluorine-containing compound to provide a polyimide low in hygroscopicity, and if the amount falls outside the given range, the effect lowers. Formula (VII) indicates the range that will provide the product with high adhesiveness, and in particular this range will provide the product with high adhesiveness to metal compounds. Formula (VIII) indicates the required lowest amount of the aminosilane that will exhibit high adhesiveness to silicon compounds, and in particular the range indicated by the formula (IX) is effective in suppressing an increase in the thermal expansion coefficient due to the fluorine compound.

The reaction solvent is used preferably in an amount of 40 wt. % or more based on the total amount of the solvent and the raw materials. If the amount of the reaction solvent is less than that, in some cases, the stirring operation becomes difficult.

Preferably the reaction is carried out at 0° C. to 80° C. Preferably the reaction time is 0.2 to 40 hours.

With respect to the addition order of the reactant raw materials to the reaction system, all of the tetracarboxylic acid dianhydride, the diamine and the aminosilane may be added to the reaction solvent simultaneously, or after part or all of the former two compounds may be reacted previously, then the remaining parts of said two compounds and/or the aminosilane may be reacted with the resulting product. If the aminosilane is added last, a polymer having a high molecular weight is liable to be obtained. The tetracarboxylic acid dianhydrides include at most two types, that is, fluorine-containing compounds represented by formula (I), and compounds free from fluorine represented by formula (II), and the diamines include at most two types, that is, fluorine-containing compounds represented by formula (III) and diamines free from fluorine represented by formula (IV), and their reactions may be carried out in any order. The form of the bonding includes at most four types, and they may be arranged in the form of blocks or in random form. Further, when several compounds falling in the same type are used, the number of the forms of the bonding increases, and in that case also the same can be applied to the arrangement. Aminosilanes are arranged to the bond ends of them.

In the reaction according to the present method, it is considered that compounds represented by the following formulae (X), (XI), and (XII) are yielded.

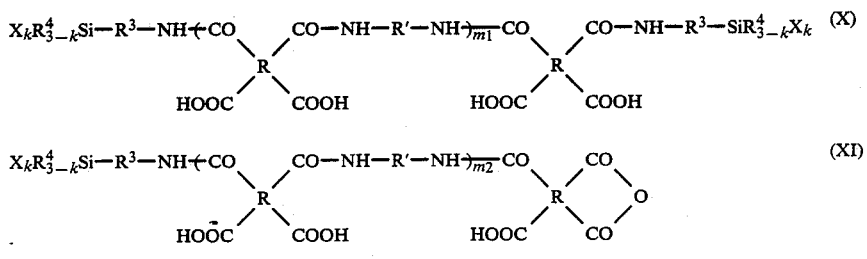

wherein R represents

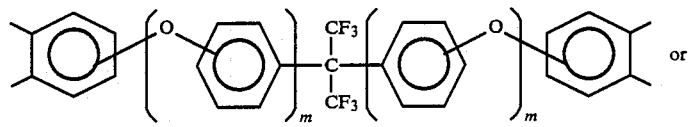

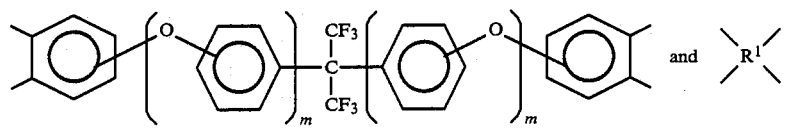

R' represents

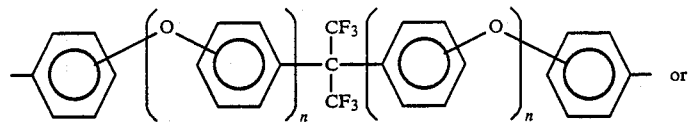

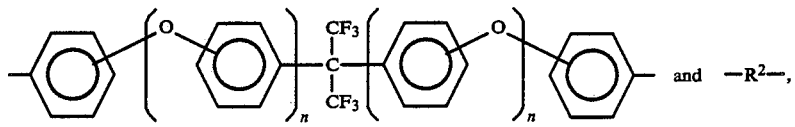

and $-R^2-$, $R^1$, $R^2$, $R^3$, $R^4$, X, k, m and n have the same meanings as defined above, and $m_1$, $m_2$, and $m_3$ each are 0 or a positive integer.

In this way, a silicon-containing polyimide precursor can be obtained that has an appropriate logarithmic viscosity number of 0.05 to 5 dl/g, that is, has an appropriate molecular weight, and is soluble in solvents. If the logarithmic viscosity number is less than 0.05 dl/g, the spread state of the coating liquid is not good, and therefore the coating cannot be well formed, while if the logarithmic viscosity number is over 5 dl/g, the silicon-containing polyimide precursor becomes difficult to dissolve or becomes insoluble, and is hardly used in practice.

When a solution containing the obtained silicon-containing polyimide precursor is baked at 50° to 500° C., preferably 200° to 400° C., for 0.5 to about 2 hours, the solvent can be evaporated, and the precursor can be crosslinked and cured. In this reaction, the amide acid in the polyimide precurser is dehydrated and cyclized so that imide linkages may be formed, and, at the same time, X that is a hydrolyzable group at the end of the molecule is hydrolyzed and then undergoes a condensation reaction, thereby forming a product having a high molecular weight to form a tough coating. It is considered that the acid anhydride present at the end of the polyamide acid reacts with water that has been produced or water present in the atmosphere to form carboxylic acids. Only when the carboxylic acids and Si are present in the polymer are in ranges stipulated by formulae (VII) and (VIII) mentioned above, the resulting coating is excellent in adhesion to different base materials such that silicon compounds, metals, and inorganic compounds or adhesion between such coatings, and when the fluorine-containing compound is present in the range stipulated by formula (VI) mentioned above, a coating low in hygroscopicity can be formed.

It will now be described how to use the precursor obtained according to the invention.

In most cases, since the precursor produced according to the present invention is used in the state of a solution containing the precursor in a solvent, for example, in the form of a varnish, it is good that the solution obtained according to the present invention is used as it is, or is used after condensing or diluting it. As a diluting solvent, can be used the same solvent as the reaction solvent. When a molded article is formed from a solution containing a precursor obtained in accordance with the present invention, any of known processes may be employed. For example, after the precursor solution is cast on a glass plate, a copper plate, an aluminum plate or the like, it is heated so that the solvent is removed and that the crosslinking takes place due to the siloxane bonding to form a hard tough coating. If such a procedure is repeated successively, a composite material having laminated layers can be formed, and if a varnich obtained according to the present invention is applied as an adhesive between different materials, and is baked, a composite material having laminated layers can also be obtained. If a filler or glass fiber is impregnated with such a varnish, and the varnish is baked and cured, it is possible to obtain a laminated material having a reinforced film. Although the baking conditions vary depending on the type of the solvent, the thickness of the coating, etc., such as baking conditions are sufficient if the baking temperature is 50° C. to 500° C., preferably 200° to 400° C., and the baking period is 0.5 to about 2 hours.

The silicon-containing polyamide cured material obtained by the process according to the present invention is not only excellent in heat resistance, mechanical properties, electrical properties, and adhesion, but also, taking into consideration that it is a polyimide, low in hygroscopicity, and it can be expected that it is used as coating agents for glasses, ceramics, silicon wafers, various metal compounds, and as liquid crystal orientation films, adhesives, machine parts, various molded articles, fiber impregnated structural members, films, fibers. Since the precursor obtained according to the present process has an appropriate logarithmic viscosity number, the solution has also an appropriate viscosity, and the application can be carried out favorably. Since the applied coating obtained by the process of the present invention has fluorine atoms in the molecule, not only the weak point of polyimides that they are high in hygroscopicity has been suppressed, but also the applied coating exhibits high adhesiveness to glasses, ceramics, silicon wafers, or various metals when the mixing ratio of the raw materials comprising diacid anhydrides, diamines, and an aminosilane is kept within specified ranges. Further, by increasing the amount of the aminosilane, it is possible to suppress to a certain extent the extreme increase of the thermal expansion coefficient due to the fluorine compound, and such a property is preferable not only for a laminated material involving inorganic compounds, but also for various coating agents, liquid crystal orientation films, adhesive agents, machine parts, various molded articles, fiber impregnated structural parts, films, or fiber materials.

EXAMPLES

The present invention will now be described in more detail with reference to Examples and Comparative Examples, but it is needless to say the present invention is not limited to the Examples.

EXAMPLE 1

After the inside of a 1-l flask equipped with an agitator, a dropping funnel, a thermometer, a condenser, and a nitrogen gas replacing apparatus was replaced with nitrogen gas, 500 g of dehydrated and purified N-methyl-2-(pyrrolidone (hereinafter abbreviated to NMP), 12.56 g (0.116 mol) of p-phenylenediamine (hereinafter abbreviated to p-PDA), and 77.38 g (0.174 mol) of 2,2-bis(3,4-dicarboxyphenyl)hexafluoropropane dianhydride (hereinafter abbreviated to 6FDA) were charged into the flask, and the reaction was effected at 30° to 35° C. for 7 hours with stirring to form a uniform solution. 19.83 g (0.0930 mol) of aminophenyltrimethoxysilane (100 % were in the form of p-isomer; hereinafter abbreviated to APMS) were added to the solution, and the reaction was further effected at the same temperature for 2 hours thereby producing a silicon-containing polyimide precursor solution according to the present process that was a yellow transparent liquid. The logarithmic viscosity number of the precursor measured in NMP was 0.33 dl/g.

EXAMPLE 2

In the similar way to that used in Example 1, and using the similar apparatus to that used in Example 1, 49.54 g (0.103 mol) of 2,2-bis{4-(4-aminophenoxy)-phenyl}hexafluoropropane (hereinafter abbreviated to HFBAPP), 30.67 g (0.144 mol) of APMS (100 % were in the form of p-isomer), and 44.80 g (0.205 mol) of pyromellitic acid dianhydride (hereinafter abbreviated to PMDA) were charged into 500 g of NMP, and the reaction was effected at 35° to 40° C. for 5 hours thereby producing a silicon-containing polyimide precursor solution according to the present process that was a pale yellow transparent liquid. The logarithmic viscosity number of the precursor measured in NMP was 0.15 dl/g.

EXAMPLE 3

In the similar way to that used in Example 1, and using the similar apparatus to that used in Example 1, 13.04 g (0.0270 mol) of HFBAPP and 14.61 g (0.135 mol) of p-PDA were charged into 500 g of NMP, then 63.62 g of 3,3',4,4'-biphenyltetracarboxylic acid dianhydride (hereinafter abbreviated to BPDA) were added thereto, and then after the reaction was carried out at 30° to 35° C. for 10 hours, 18.45 g (0.0865 mol) of APMS (45 % were in the form of m-isomer, and 55 % were in the form of p-isomer) were added thereto thereby producing a silicon-containing polyimide precursor solution according to the present process that was a yellow transparent liquid. The logarithmic viscosity number measured in NMP was 0.57 dl/g.

EXAMPLE 4

In the similar way to that used in Example 1, and using the similar apparatus to that used in Example 1, 34.79 g (0.0721 mol) of HFBAPP were dissolved in 500 g of NMP, then 32.02 g (0.0721 mol) of 6FDA were added thereto, and then after the reaction was effected at 25° to 30° C. for 7 hours, 26.15 g (0.123 mol) of APMS (45 % were in the form of m-isomer, and 55 % were in the form of p-isomer) and 32.02 g (0.0721 mol) of 6FDA were added, the reaction was effected at the same temperature for 5 hours thereby producing a silicon-containing polyimide precursor solution according to the present process that was a yellow transparent liquid. The logarithmic viscosity number of the precursor measured in NMP was 0.52 dl/g.

EXAMPLE 5

In the similar way to that used in Example 1, and using the similar apparatus to that used in Example 1, 4.83 g (0.0100 mol) of HFBAPP and 4.45 g (0.0100 mol) of 6FDA were charged into 500 g of N,N-dimethylacetamide, and after the reaction was effected at 25° to 30° C. for 2 hours, 28.09 g (0.140 mol) of 4,4'-diaminodiphenyl ether (hereinafter abbreviated to DDE), and 48.44 g (0.150 mol) of 3,3',4,4'-benzophenonetetracarboxylic acid dianhydride were added thereto, the reaction was effected at the same temperature for 6 hours. Thereafter, 2.44 g (0.0110 mol) of 3-aminopropyltriethoxysilane were added thereto, and the reaction was effected at the same temperature for 2 hours thereby producing a silicon-containing polyimide precursor solution according to the present process that was a yellow transparent liquid. The logarithmic viscosity number of the precursor measured in N,N-dimethylacetamide was 1.7 dl/g.

EXAMPLE 6

In the similar way to that used in Example 1, and using the similar apparatus to that used in Example 1, 11.40 g (0.0236 mol) of HFBAPP, 33.56 g (0.0866 mol) of 2,2-bis{4-(4-aminophenoxy)phenyl}propane, and 37.07 g (0.126 mol) of BPDA were charged into 500 g of NMP, and after the reaction was effected at 25° to 30° C. for 15 hours, and then 4.22 g (0.0220 mol) of 3-aminopropylmethyldiethoxysilane were added thereto, the reaction was effected at 50° C. for 3 hours thereby producing a silicon-containing polyimide precursor according to the present invention that was a yellow transparent liquid. The logarithmic viscosity number of the precursor measured in NMP was 1.3 dl/g.

EXAMPLE 7

In the similar way to that used in Example 1, and using the similar apparatus to that used in Example 1, 11.10 g (0.0230 mol) of HFBAPP, 33.92 g (0.0921 mol) of 4,4'-bis(4-aminophenoxy)biphenyl, and 10.22 g (0.0230 mol) of 6FDA were charged into 500 g of N,N-dimethylformamide, and after the reaction was effected at 25° to 30° C. for 2 hours, 25.10 g (0.115 mol) of PMDA were added thereto, and the reaction was effected at the same temperature for 8 hours. Thereafter, 7.86 g (0.0368 mol) of APMS (78 % were in the form of m-isomer, and 22 % were in the form of p-isomer) were added, and the reaction was effected at the same temperature for 3 hours thereby producing a silicon-containing polyimide precursor according to the present process that was a pale yellow transparent liquid. The logarithmic viscosity number of the precursor measured in N,N-dimethylformamide was 0.82 dl/g.

COMPARATIVE EXAMPLE 1

In the similar way to that used in Example 1, and using the similar apparatus to that used in Example 1, 45.95 g (0.0953 mol) of HFBAPP and 42.29 g (0.0952 mol) of 6FDA were charged into 500 g of NMP, and the reaction was effected at 30° to 35° C. for 10 hours thereby producing a pale yellow transparent polyimide precursor solution. The logarithmic viscosity number of the precursor measured in NMP was 1.6 dl/g.

COMPARATIVE EXAMPLE 2

In the similar way to that used in Example 1, and using the similar apparatus to that used in Example 1, 26.76 g (0.134 mol) of DDE and 58.31 g (0.267 mol) of PMDA were charged into 500 g of NMP, then the reaction was effected at 20° to 25° C. for 7 hours, and after 39.92 g (0.187 mol) of APMS (78 % were in the form of m-isomer, and 22 % were in the form of p-isomer) were added thereto, and the reaction was effected at the same temperature for 3 hours thereby producing a yellow transparent polyimide precursor solution. The logarithmic viscosity number of the precursor measured in NMP was 0.20 dl/g.

COMPARATIVE EXAMPLE 3

In the similar way to that used in Example 1, and using the similar apparatus to that used in Example 1, 17.28 g (0.160 mol) of p-PDA, and 70.96 g (0.160 mol) of 6FDA were charged into 500 g of NMP, and the reaction was effected at 30° to 35° C. for 10 hours thereby producing a yellow transparent polyimide precursor solution. The logarithmic viscosity number of the precursor measured in NMP was 1.8 dl/g.

For reference, the amounts of the raw materials used in Examples 1 to 7 and Comparative Examples 1 to 3, $A^1$, $A^2$, $B^1$, $B^2$, and C mols, and the values of $$\frac{A^1 + B^1}{A^1 + A^2 + B^1 + B^2 + C}, \frac{C}{A^1 + A^2 - B^1 - B^2}, \text{ and }$$

$$\frac{C}{B^1 + B^2 + C}$$

are given in Table 1.

measured, and the hygroscopic coefficient was determined by the formula:

$$\frac{W - W_0}{W_0} \times 100 \, (\%)$$

The results are shown in Table 2.

(2) Measurement of the Adhesion

Each varnish was applied onto each slide glass, each aluminum plate, and each copper plate by a spinner, the baking was carried out at 100° C. for 1 hour, and then at 300° C. for 1 hour to form a 1-μm to 2-μm coating. To test the adhesion between coatings that are of the same type, each of the same varnishes was applied on the aluminum plate having the thus formed coating of the same varnish, and the baking was carried out under the same conditions as above to form a coating having laminated layers. Cuts were formed in the resulting coating so that squares measuring 2 mm on side might be formed, and an adhesive cellophane tape was stuck

TABLE 1

| Example and Comparative Example No. | $A^1$ (mol) | $A^2$ (mol) | $B^1$ (mol) | $B^2$ (mol) | C | $\frac{A^1 + B^1}{A^1 + A^2 + B^1 + B^2 + C}$ | $\frac{C}{A^1 + A^2 - B^1 - B^2}$ | $\frac{C}{B^1 + B^2 + C}$ |
|---|---|---|---|---|---|---|---|---|
| Example No. 1 | 0.174 | | | 0.116 | 0.0930 | 0.454 | 1.60 | 0.445 |
| Example No. 2 | | 0.205 | 0.103 | | 0.144 | 0.228 | 1.41 | 0.583 |
| Example No. 3 | | 0.216 | 0.0270 | 0.135 | 0.0865 | 0.0581 | 1.60 | 0.348 |
| Example No. 4 | 0.0721 + 0.0721 = 0.144 | | 0.0721 | | 0.123 | 0.637 | 1.71 | 0.630 |
| Example No. 5 | 0.0100 | 0.150 | 0.0100 | 0.140 | 0.0110 | 0.0623 | 1.10 | 0.0683 |
| Example No. 6 | | 0.126 | 0.0236 | 0.0866 | 0.0220 | 0.0914 | 1.39 | 0.166 |
| Example No. 7 | 0.0230 | 0.115 | 0.0230 | 0.0921 | 0.0368 | 0.159 | 1.61 | 0.242 |
| Comparative Example No. 1 | 0.00952 | | 0.0953 | | | 1.00 | 0 | 0 |
| Comparative Example No. 2 | | 0.267 | | 0.134 | 0.187 | 0 | 1.41 | 0.583 |
| Comparative Example No. 3 | 0.160 | | 0.160 | | | 0.500 | 0 | 0 |

EXAMPLE 8

Each of the varnishes synthesized in Examples 1 to 7 and Comparative Examples 1 to 3 was formed into a coating, and the following physical properties were measured.

(1) Measurement of the Hygroscopic Coefficient

Each silicon wafer was coated by using a spinner with each varnish, and it was baked in an electric oven at 100° C. for 1 hour, then at 200° C. for 1 hour, and then at 350° C. for 1 hour to form a coating having a coating thickness of 4 to 5 μm. Then after it was allowed to stand at a temperature of 23°±2° C. and a relative humidity of 50 to 60% for 24 hours, it was dried again in the electric oven at 120° C. for 1 hour. Then after it was cooled to room temperature in a desiccator, it was weighed, and the weight of the silicon wafer that had been previously measured was subtracted from the obtained weight to determine the weight ($W_0$) of the coating. After this silicon wafer whose one surface was coated with the polyimide coating was allowed again to stand at a temperature of 23°±2° C., and a relative humidity of 50 to 60 % for 3 days, the weight (W) was thereon and then was removed immediately. The number of the square pieces of the coating removed together with the adhesive cellophane tape per 100 square pieces of the coating before the removal of the tape is shown in Table 2.

(3) Measurement of the Thermal Expansion Coefficient

After each of the varnishes was uniformly applied on each polyester film by a coater, it was dried at 100° C. for hour in a dryer to remove most of the solvent thereby forming a film. This film was removed from the polyester film, and after the circumference of the film was fixed between two iron plates, it was baked in an electric oven having a nitrogen atmosphere at 200° C. for 1 hour, and then at 350° C. for 1 hour thereby producing a polyimide film having a film thickness of 30 to 50 μm. The obtained film was placed in a nitrogen atmosphere in a thermomechanical tester (TM-7000) (manufactured by Shinku Riko Kabushiki-Kaisha), the temperature was raised from room temperature to 450° C., and the change in the length of the film was measured to determine the thermal expansion coefficient (linear expansion coefficient). The average value of the thermal expansion coefficient at 30° to 450° C. was determined. The results are shown in Table 2.

TABLE 2

| Example and Comparative Example No. | Hygroscopic coefficient | Adhesion to | | | Thermal expansion coefficient ($\times 10^{-5} \text{deg}^{-1}$) |
|---|---|---|---|---|---|
| | | Slide glass | Aluminum plate | Copper plate | |
| Example No. 1 | 0.23 | 0 | 0 | 0 | 4.7 |
| Example No. 2 | 0.25 | 0 | 0 | 0 | 8.6 |
| Example No. 3 | 1.5 | 0 | 0 | 0 | 2.5 |
| Example No. 4 | 0.22 | 0 | 0 | 0 | 9.5 |
| Example No. 5 | 1.2 | 0 | 0 | 0 | 5.3 |
| Example No. 6 | 0.82 | 0 | 0 | 0 | 5.9 |
| Example No. 7 | 0.46 | 0 | 0 | 0 | 6.5 |
| Comparative Example No. 1 | 0.20 | 100 | 0 | 0 | 43 |
| Comparative Example No. 2 | 3.0 | 0 | 0 | 0 | 4.8 |
| Comparative Example No. 3 | 0.58 | 100 | 0 | 0 | 21 |

What is claimed is:

1. A process of producing a silicon-containing polyamide precursor that has a logarithmic viscosity number of 0.05 to 5 dl/g measured at an in-solvent temperature of 30°±0.01° C. with the concentration being 0.5 g/dl characterized by reacting $A^1$ mols of a fluorine-containing diacid anhydride represented by the formula (I) given below, $A^2$ mols of a diacid anhydride represented by the formula (II) given below, $B^1$ mols of a fluorine-containing diamine represented by the formula (III) given below, $B^2$ mols of a diamine represented by the formula (IV) given below, and C mols of an aminosilane represented by the formula (V) given below with the mixing ratio being in the ranges given by the formulae (VI) to (VIII) given below:

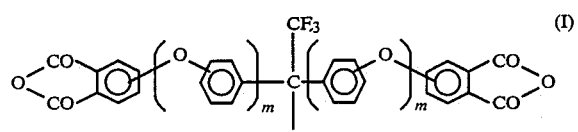　(I)

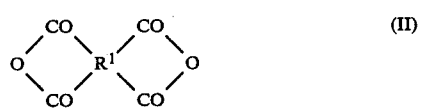　(II)

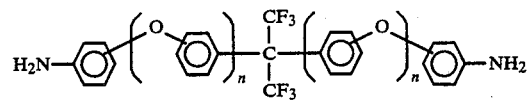　(III)

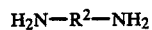　(IV)

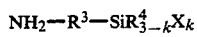　(V)

$$\frac{A^1 + B^1}{A^1 + A^2 + B^1 + B^2 + C} \geq 0.05 \quad \text{(VI)}$$

$$1 \leq \frac{C}{A^1 + A^2 - B^1 - B^2} \leq 1.8 \quad \text{(VII)}$$

$$\frac{C}{B^1 + B^2 + C} \geq 0.05 \quad \text{(VIII)}$$

wherein $R^1$ represents a tetravalent carbocyclic aromatic group or heterocyclic group, $R^2$ represents an aliphatic group that has at least two carbon atoms, an aliphatic group, an araliphatic group, a carbocyclic aromatic group, a heterocyclic group or a polysiloxane group, $R^3$ represents $-(CH_2)_s-$, 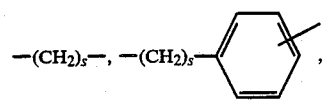

wherein s is an integer of 1 to 4, $R^4$ represents an alkyl group having 1 to 6 carbon atoms, a phenyl group, an alkyl-substituted phenyl group having 7 to 12 carbon atoms, X represents an alkoxy group, an acetoxy group, or halogen, m is 0 or 1, n is 0 or 1, and k is a value represented by $1 \leq k \leq 3$.

2. A process as set forth in claim 1 wherein $R^3$ represents the group

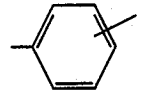

which is in the form of an ortho-isomer, a meta-isomer, a para-isomer, or mixtures thereof.

3. A process of producing a silicon-containing polyamide, characterized in that a solution containing the precursor obtained according to the process set forth in claim 1 is baked at 50° to 500° C. to evaporate the solvent and to crosslink and cure said precursor.

4. The process set forth in claim 1 wherein $B^1$, $B^2$ and C are in the range defined by the following formula $$\frac{C}{B^1 + B^2 + C} \geq 0.2$$

5. The process as set forth in claim 4 wherein $R^3$ represents a group

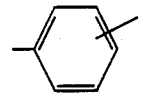

which is in the form of an ortho-isomer, a meta-isomer, a para-isomer or mixtures thereof.

* * * * *